United States Patent [19]

Godbersen

[11] Patent Number: 4,802,685
[45] Date of Patent: Feb. 7, 1989

[54] WINCH ASSEMBLY FOR USE WITH A BOAT TRAILER OR THE LIKE

[76] Inventor: Byron L. Godbersen, Lake LaJune Estates, Ida Grove, Iowa 51445

[21] Appl. No.: 176,211

[22] Filed: Mar. 31, 1988

Related U.S. Application Data

[62] Division of Ser. No. 112,476, Oct. 26, 1987.

[51] Int. Cl.[4] ............................................. B60P 3/10
[52] U.S. Cl. .............................. 280/414.1; 114/344; 414/559
[58] Field of Search ........................ 114/343, 344; 280/414.1; 414/559

[56] References Cited

U.S. PATENT DOCUMENTS

| | | | |
|---|---|---|---|
| 3,122,245 | 2/1964 | MacKusick et al. | 280/414.1 |
| 3,788,502 | 1/1974 | Bell | 280/414.1 |
| 3,822,899 | 7/1974 | Slack | 280/414.1 |
| 3,870,339 | 3/1975 | Goff | 280/414.1 |
| 4,530,634 | 7/1985 | Johnson | 280/414.1 |
| 4,697,976 | 10/1987 | Godbersen | 280/414.1 |

Primary Examiner—Sherman D. Basinger
Assistant Examiner—Stephen P. Avila
Attorney, Agent, or Firm—Henderson & Sturm

[57] ABSTRACT

A boat trailer having a frame, wheel unit, an adjustably mounted winch unit including a keel engaging member, an elongated second keel engaging member pivotally mounted on the frame rearwardly of the winch unit and self-centering to engage a longitudinal length of the keel, a pair of fender units each of which is reversibly mountable on either side of the frame for projecting a wheel, a pair of unitary post load guide brackets slidably engaged with the rear of the frame members and each supporting both a post guide and a rear taillight, a cross member pivotally and longitudinally adjustably mounted at each end to a frame member, and a pair of bunks and a pair of aligned, resiliently mounted roller units interchangeably mounted on said cross member for providing an automatic, full line engagement of either the bunks or the roller units with the bottom of the hull, when loaded, in combination with the second keel engaging member, forming a self-adjusting three point support of the boat hull.

2 Claims, 6 Drawing Sheets

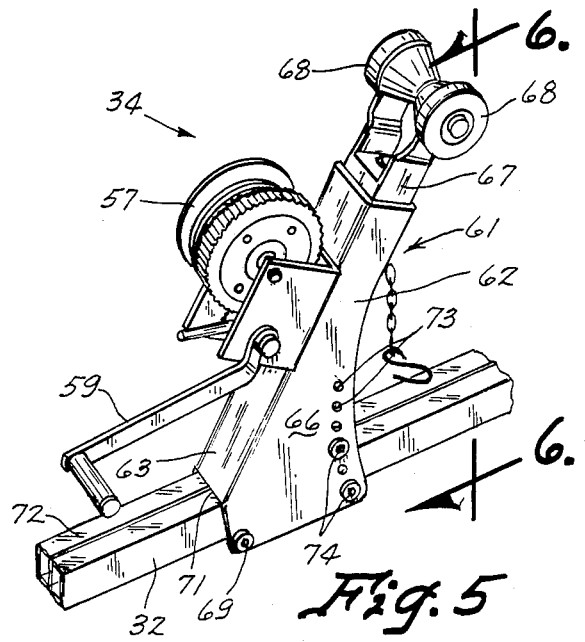
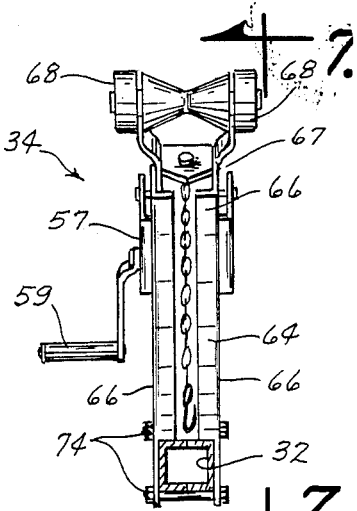
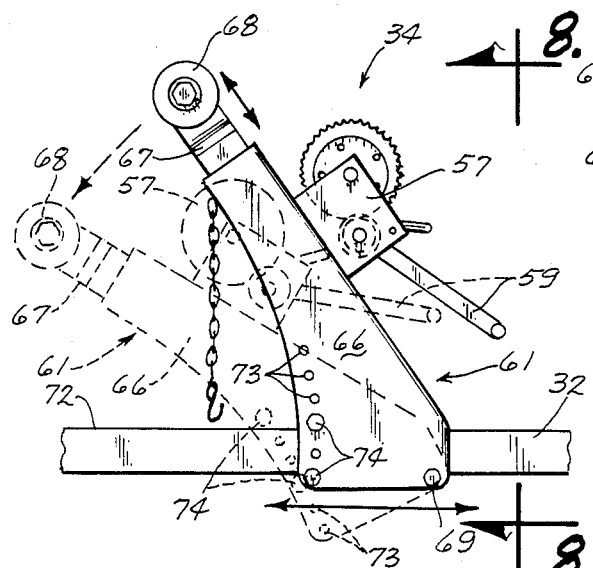
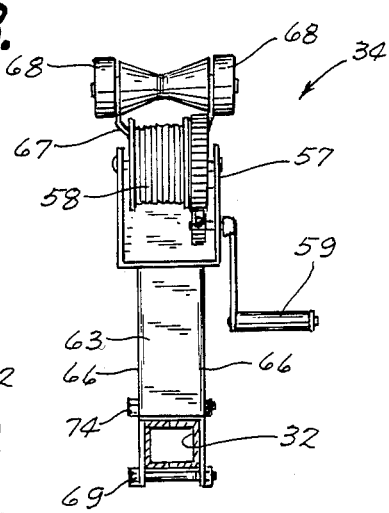

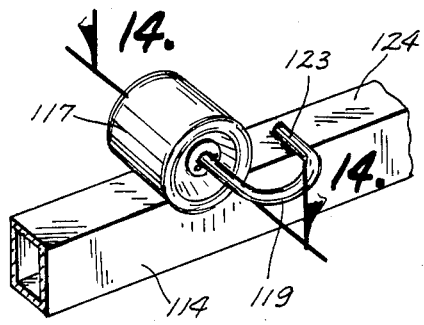
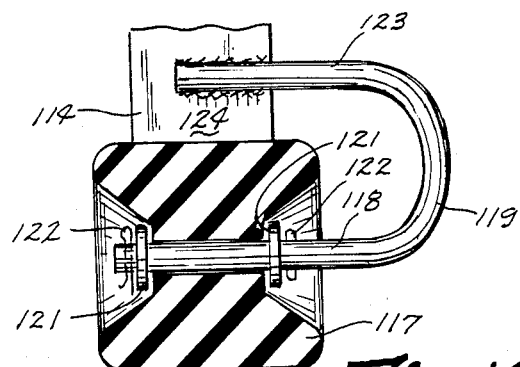
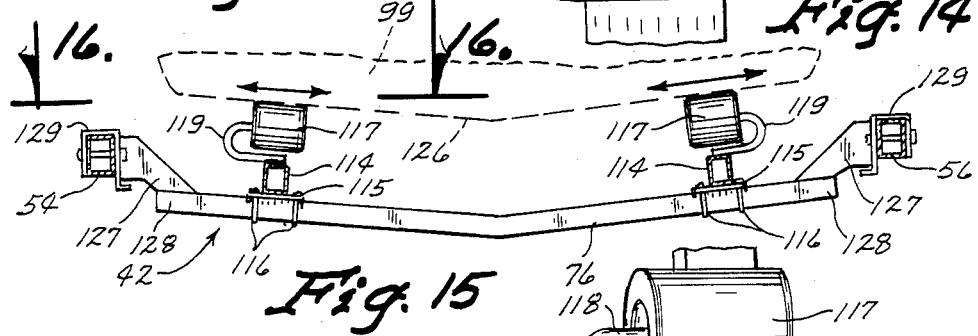
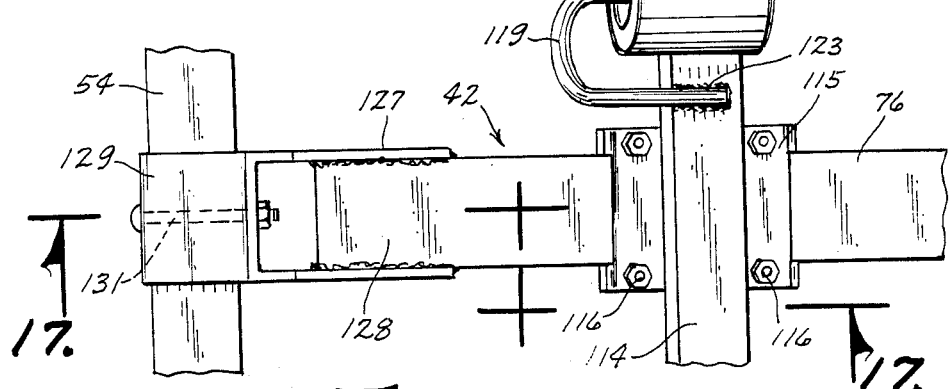
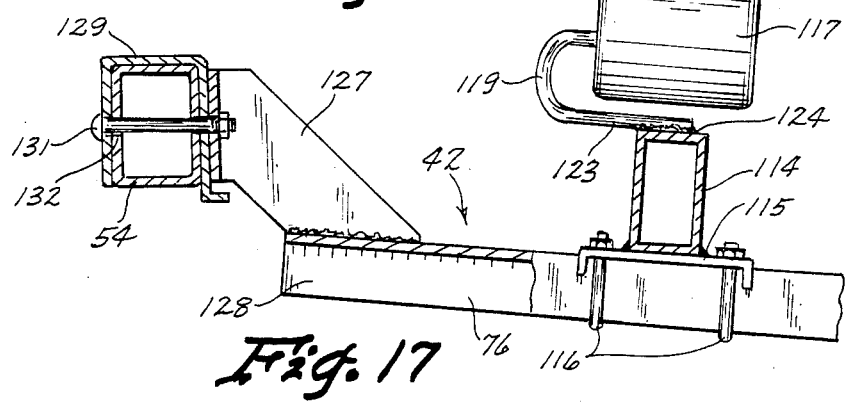

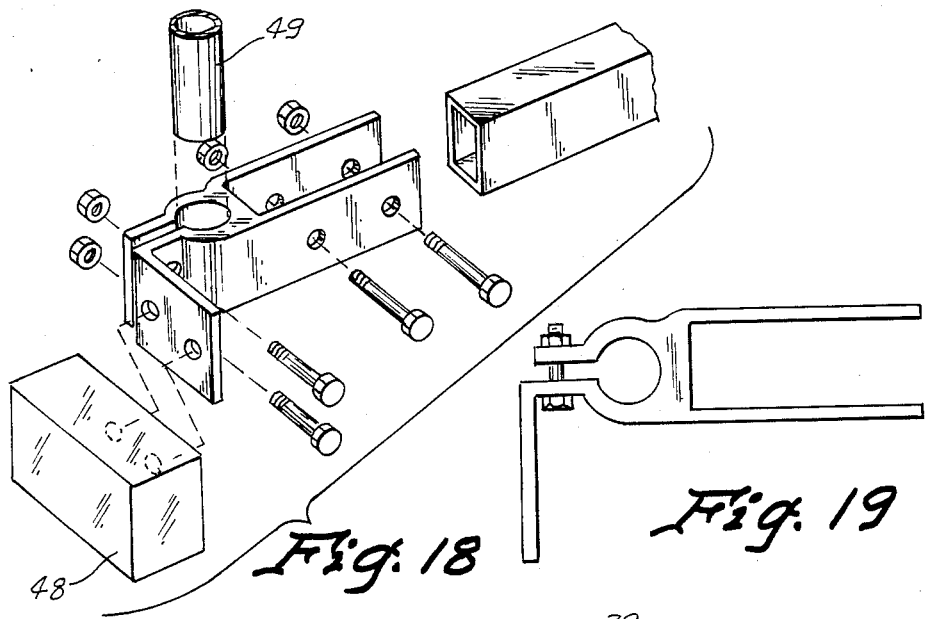
Fig. 18
Fig. 19
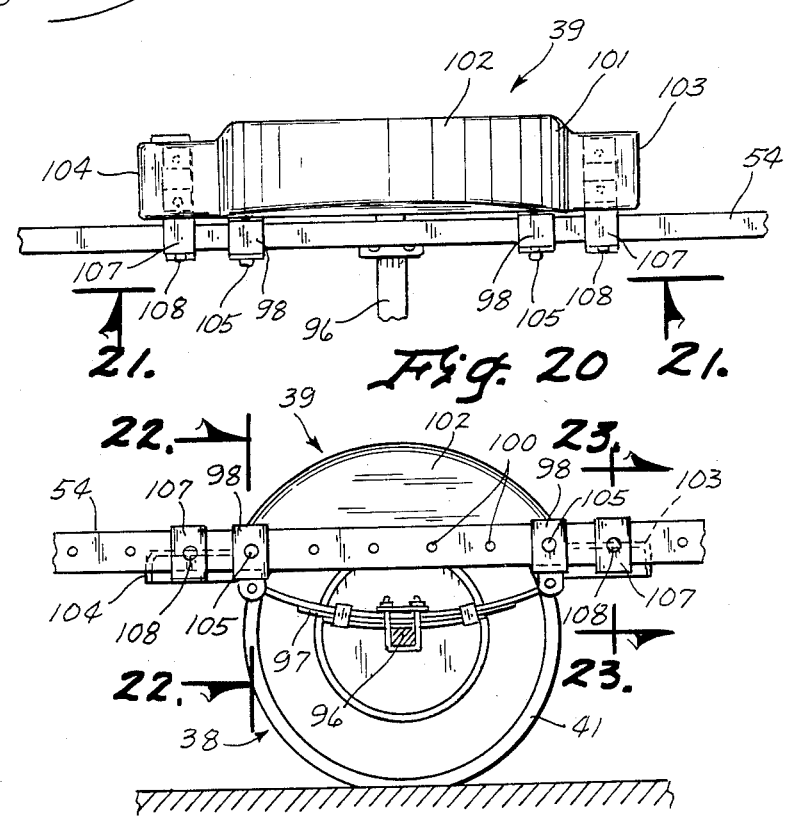
Fig. 20
Fig. 21

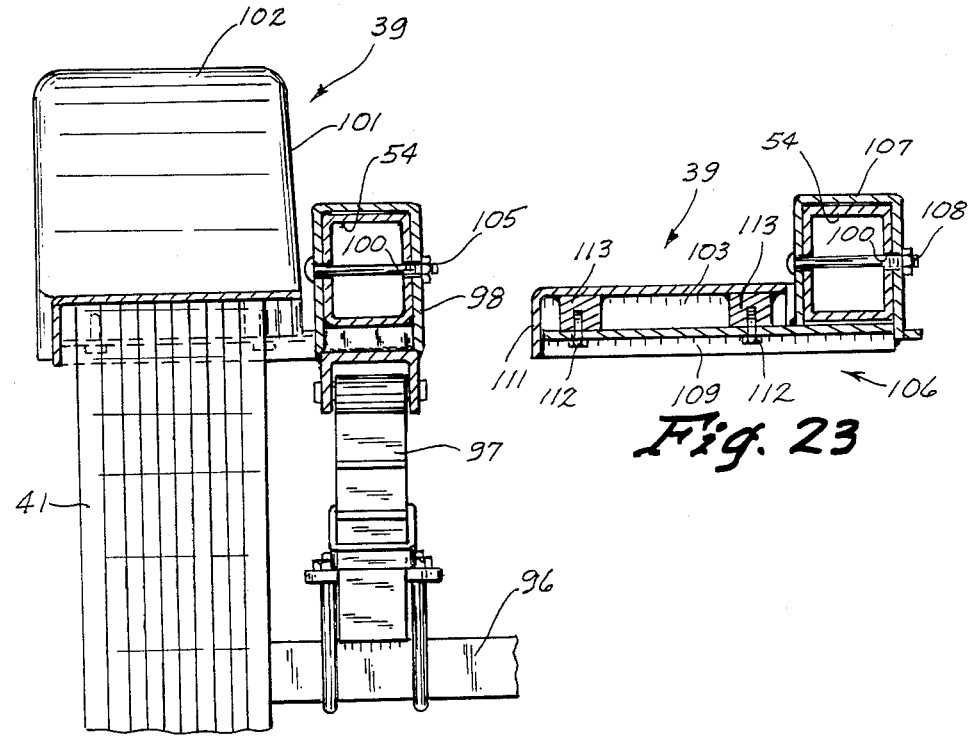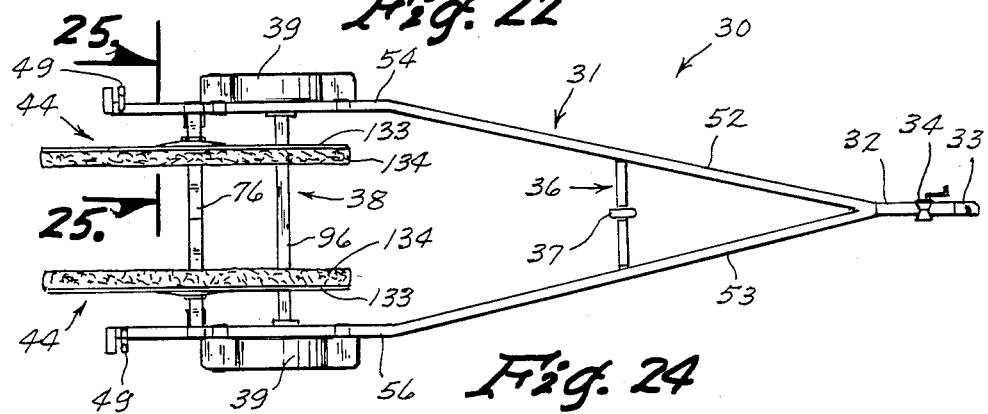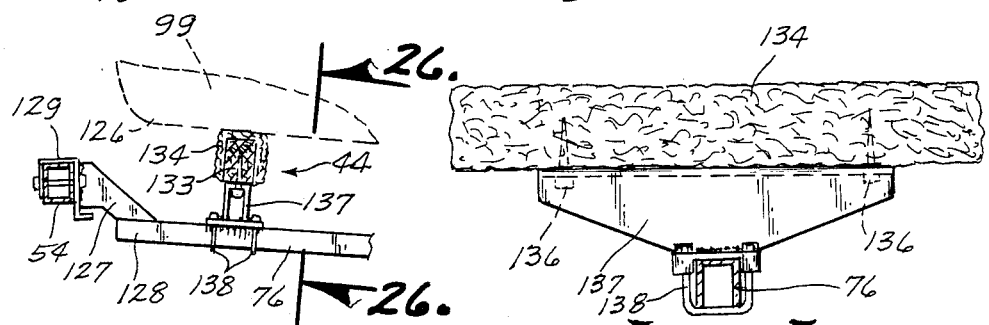

WINCH ASSEMBLY FOR USE WITH A BOAT TRAILER OR THE LIKE

This is a divisional of co-pending application ser. no. 07/112,476, filed on Oct. 26, 1987.

TECHNICAL FIELD

The present invention relates generally to boat carrying trailers, and more particularly to those of the type in which a longitudinal frame having a tongue and hitch for attachment to a prime mover is equipped with support engaging the keel and the bottom of the boat hull adjacent the bow and stern, respectively, the frame having a pair of ground wheels adjacent the rear of the frame. To load and unload the boat to and from the trailer, the trailer is moved into the water a sufficient distance to enable the boat to float on and off the trailer, as controlled by a winch assembly adjacent the hitch.

BACKGROUND ART

With an ever increasing number of different sized and shaped boats, the contemporary trailers have tended to develop an ever increasing arrangement of bow and stern supports for accommodating the great variety of trailers. Proper distribution of the weight of the trailer on the frame such that pressure on the tongue will accommodate a balanced connection to the prime mover has been attempted by having one or more stationary keel rollers mounted forwardly on the frame, and either bunks or gangs of horizontally and vertically adjustable rollers mounted rearwardly on the frame. Examples of various such arrangements are shown in U.S. Pat. Nos. 2,816,672; 2,948,423; 3,744,790 and 3,917,087.

Nevertheless, the trailer industry has not only not solved the constant problem of ease of adjustment for proper tongue weight distribution, but has exaecerbated the problem by proliferation of the types and arrangement of gangs of rollers such that the problem has acutally worsened. Further, there have been no improvements of consequence to winch and stand assemblies, fender units, post load guide, and tail light units, all important to the use and safety of this type boat trailer.

Still further, an improved three point support for the keel and hull bottom is necessary to enable a single boat trailer to provide readily available equal weight distribution for the boat, regardless of size and shape, but of course within the parameters of the trailer's capacity, and with a minimum of adjustments.

Lastly, in the forementioned bunks and gangs of rollers, these have required different mounting structures, thus increasing the amount and type of structure required, with all other increases of costs and servicing needs. Standardization of these mounting requirements is necessary.

DISCLOSURE OF THE INVENTION

The invention comprises a trailer for transporting a boat or the like, the trailer having a longitudinal frame of a wishbone shape; the forward torque end having a hitch for connection to a prime mover; having a stand-mounted winch assembly for cable control of the boat, the stand being tiltably adjustably mounted; a wheel and axle unit mounted rearwardly on the frame and movably mounted thereon for fore and aft adjustment; a keel supporting unit secured to the frame forwardly of the wheels and including an elongated element extended longitudinally the frame and pivotal about both longitudinal and transverse axes; and a hull supporting assembly comprising a cross member having a channel shape such that the upper outer ends thereof are pivotally mounted about transverse axes to the frame with a center portion thereby swingable longitudinally of the frame, and with either a pair of bunks or a pair of in-line roller units alternatively mounted on the cross member in a laterally spaced, parallel, longitudinally extended arrangement.

The invention comprises further the winch assembly including a vertically adjustable keel-engaging member; the keel supporting unit including transversely disposed hull centering members on either side of the keel supporting element; the in-line roller unit including a bunk-like supporting member to which a plurality of rubber-like rollers are flexibly mounted by a U-shaped element, the rollers mounted on a transverse axis and being longitudinally aligned with the frame; a pair of identical, reversible wheel fender units; and a unitary post load guide and rear tail light unit.

It is an object of this invention to provide a new and novel universal trailer of the type described herein.

It is another object of this invention to provide an improved boat trailer of the float-on type, wherein the forward keel support has pivotal and longitudinal support.

It is yet another object of this invention to provide a float-on type boat trailer where pre-adjustments of the hull supports are readily made, and wherein less roller and the like adjustments are required.

Yet another object of this invention is to provide an improved three point keel and hull bottom support providing equal weight distribution for each of a variety of boats by a single, universal boat trailer.

Another object of this invention is to provide an improved boat trailer where hull support bunk units and hull support roller units are quickly and easily interchanged.

It is another object of this invention to provide for automatically adjusting all keel and hull bottom support means as a boat is being loaded onto the trailer, with opposed units of bunks or rollers cooperatively self-adjusting in tandem, and pre-adjustment thereof being kept at a minimum.

Still another object of this invention is to provide an improved boat trailer wherein a support for the hull bottom supporting bunk units or roller units is adjustably movable longitudinally on the frame and also provides for the points of support to be adjustably movable longitudinally relative to the frame.

Another object of this invention is to provide a new and novel winch assembly for a boat trailer.

Yet another object of this invention is to provide an improved winch assembly for a boat trailer wherein the positioning of the stand therefor is longitudinally and vertically adjustable.

Still another object of this invention is to provide a new and novel keel supporting unit forwardly of the trailer wheels, and where the unit includes a self-centering, elongated element for longitudinal support of the keel.

Another object of this invention is to provide a new and novel boat hull bottom supporting assembly wherein hull bottom supporting units are self-pivotally adjuatably simultaneously, and further wherein the supporting units either bunks or in-line rollers are quickly interchangeable.

It is another object of this invention to provide a new and novel unitary fender unit for a boat trailer which may be used on either side of the trailer without structural changes.

Yet another object of this invention is to provide a new and novel post head guide unit for a boat trailer, wherein an integral member provides means for supporting a post head guide and a tail light while fastening to the trailer frame.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 5 is an enlarged fragmentary perspective view of a winch stand assembly of this invention;

FIG. 6 is a rear elevational view thereof as taken along the line 6—6 in FIG. 5;

FIG. 7 is a side elevational view of the winch stand assembly as taken along the line 7—7 in FIG. 6, and showing a tilted position thereof by dashed lines;

FIG. 8 is a front elevational view thereof as taken along the line 8—8 in FIG. 7;

FIG. 13 is a fragmentary, perspective view of a single roller for supporting the hull bottom of a boat hull supporting assembly of this invention shown in FIG. 1;

FIG. 14 is an enlarged sectional view as taken along the line 14—14 in FIG. 13;

FIG. 15 is a rear elevational view of the boat hull supporting assembly of the boat trailer of this invention;

FIG. 16 is an enlarged view as taken along the line 16—16 in FIG. 15;

FIG. 17 is an enlarged, elevational view as taken along the line 17—17 in FIG. 16;

FIG. 18 is an enlarged, exploded perspective view of the post load guide unit of this invention;

FIG. 19 is a top plan view of an integral element thereof;

FIG. 20 is a fragmentary, top plan view of a fender unit of this invention;

FIG. 21 is a sectional taken along the line 21-21 in FIG. 20 and showing the inside of the fender unit;

FIGS. 22 and 23 are enlarged sectional views as taken along the lines 22—22 and 23—23 in FIG. 21;

FIG. 24 is a plan view similar to FIG. 2, but with hull supporting bunk units substituted for the in-line roller units;

FIG. 25 is a sectional view taken along the line 25—25 in FIG. 24; and

FIG. 26 is an enlarged sectional view taken along the line 26—26 in FIG. 25.

BEST MODE FOR CARRYING OUT THE INVENTION

Figure 1:
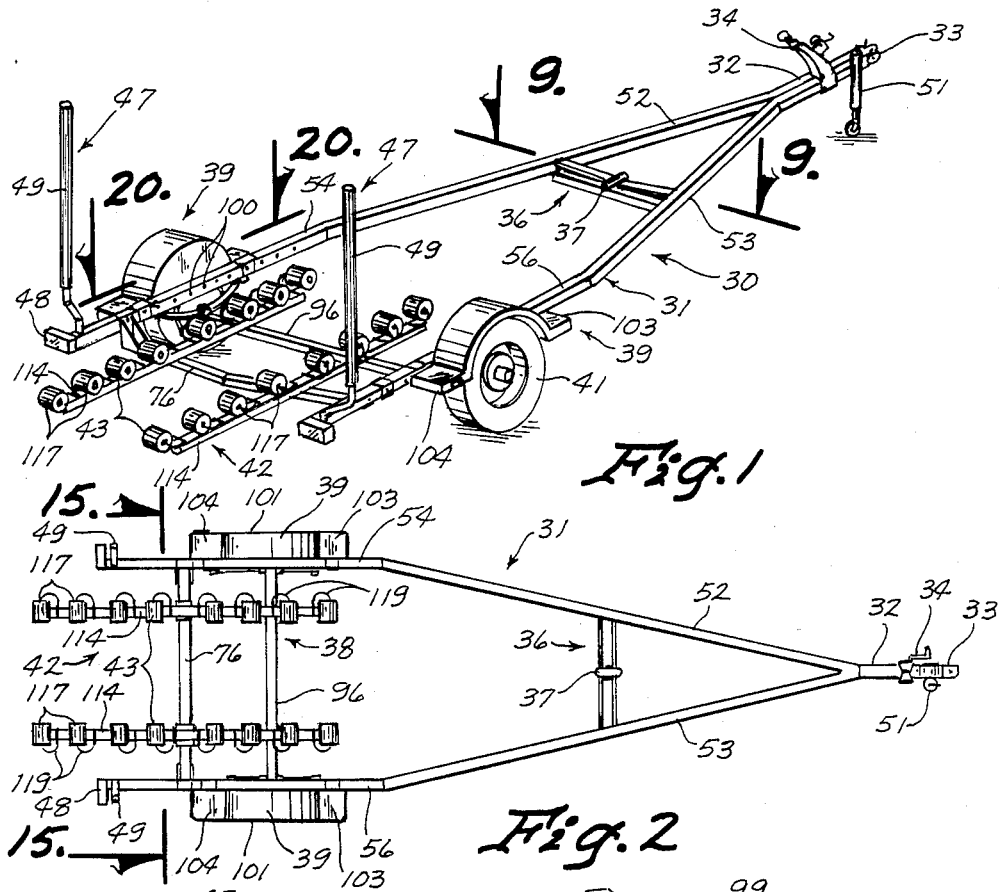
FIG. 1 is a perspective view of the boat trailer of the present invention.

Referring now to the drawings, the boat trailer of this invention is illustrated generally at (30) in FIG. 1 and comprises a frame assembly (31) including a tongue (32) and hitch (33) for conventional attachment to a prime mover such as an automobile, van or pickup; a winch and stand assembly (34) (see also FIG. 5 through 8), mounted on the tongue (32) for mounting and demounting connection to the boat (99) (FIG. 2) to be transported thereby; a hull and keel supporting assembly (36) (see also FIGS. 9 through 12A) which includes a pivotal keel supporting unit (37); a wheel and axle unit (38) for rollably supporting the rear of the frame assembly (31); a fender unit (39) (see also FIGS. 20-23) for the wheels (41); a hull supporting assembly (42) (see also FIGS. 13-17) in the form of a pair of in-line roller unit (43) or a pair of bunk units (44) (see also FIGS. 24-26), and which includes a pivotally swingable cross member (76) (see also FIGS. 15-17); and a post load guide unit (47) (see also FIGS. 18, 19) for supporting a tail light (48) and a guide post (49). A conventional jack unit (51) is provided at the front of the tongue (32) for supporting the trailer (30) in a horizontal position while not connected to a prime mover.

Figure 2:
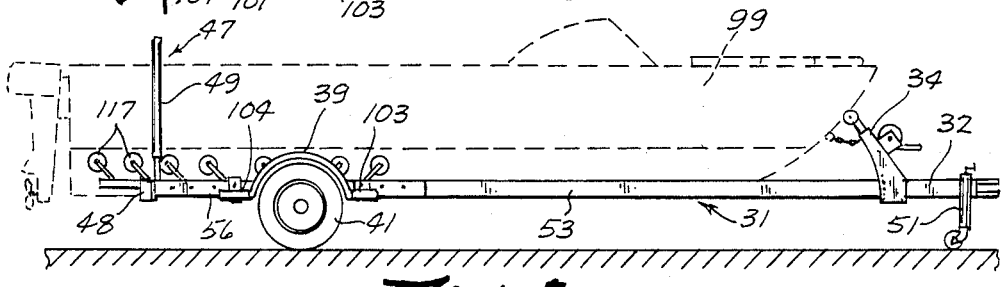
FIG. 2 is a top plan view thereof.

More particularly, the frame assembly (31) includes diverging side members (52, 53) with integral, parallel rear members (54, 56) mounted on the wheel and axle unit (38). The side members (52, 53) are interconnected by the hull and keel supporting assembly (36) (FIGS. 1 and 2).

The winch and stand assembly (34) comprises a conventional winch unit (57) rollably supporting a cable (58) for attachment to a boat to be moved onto and off of the trailer (30) by rotation of the handle (59), and a stand unit (61) adjustably mounted on the tongue (32) for supporting the winch unit (57), and movable between an upright position facing rearwardly of the trailer (30) (FIG. 3), and a position tilted even more toward the trailer rear. The stand unit (61) includes a channel shaped stand (62) having a front flat element (63) to which the winch unit (57) is mounted, and a rear, arcuately, curved element (64), both elements (63 and 64) connected to side panels (66), with straight front edges and curved rear edges. This arrangement provides a hollow neck portion (67) for vertically adjustably receiving a front boat keel engaging roller (68) therein, and provides also for the lower portions of the side panels (66) to straddle and extend below the tongue (32).

To secure the stand (62) to the tongue (32), and also to provide for a tilting adjustment of the stand (62) with the tongue, a pair of transversely aligned first openings (not shown) are formed forwardly in the side panels (66) such that a connecting element (69) can be inserted and fastened therethrough below the tongues (32), the bottom edge (71) (FIG. 5) of the front element (63) engaging the upper surface (72) of the tongue (32). Further, a plurality of transversely aligned pairs of second openings (73) are formed rearwardly in the side panels (66), the pairs of openings (73) also formed in an upwardly, rearwardly curving arc concentric with the curvature of the rear edges of the panels (66). Thus, in an inital somewhat upright position of the stand (62) (FIG. 7), fastening elements (74), like elements (69)

fasten the rear portions of the side panels (66) above and below the tongue (32), and to tiltably adjust the stand more rearwardly, the elements (74) are removed, the stand tilted rearwardly and downwardly (see the dash line position of FIG. 7), and the elements (74) are reinserted in upper pairs of transversely aligned openings (73).

The hull and keel supporting assembly (36) comprises a cross member (76) (FIGS. 1, 10, 11) secured at each outer end to a bracket (77) in turn welded to an adjacent side member (52, 53), the cross member extended transversely therebetween; hull supporting member devices (78, 79) secured at their outer ends (81, 82) to the brackets (77), extended transversely inwardly for securement to the cross member (76), and forming thereby a space therebetween; and a keel supporting device (37) (FIGS. 9, 11) pivotally mounted centrally of the cross member (76) and in between the devices (78, 79).

More particularly, each hull supporting member device (78, 79) includes an L-shaped bracket (84) (FIG. 11) secured to the cross member (76) with one leg (86) disposed laterally outwardly and slightly upwardly to receive an inner end of an elongated oval shaped, in cross section, hull supporting element (87) extending transversely to its connection with a bracket (77), both elements (87) forming an open V-shape (FIGS. 10, 11) to receive and support the forward hull of the boat.

Figure 9:
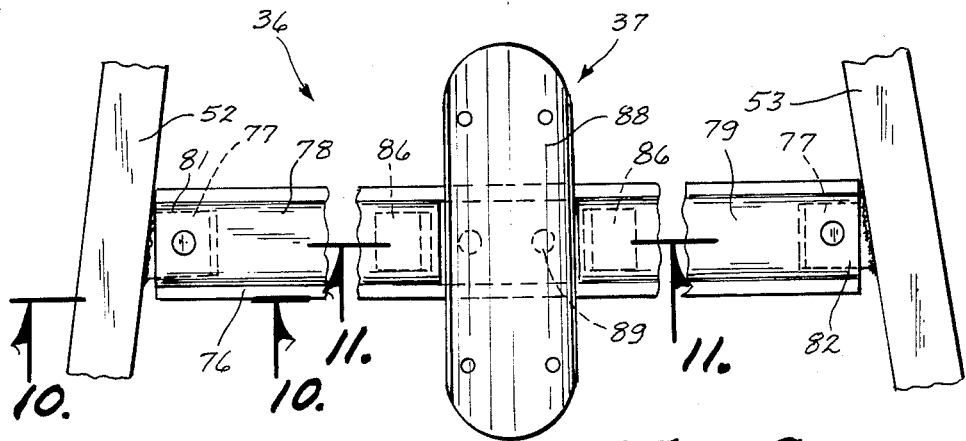
FIG. 9 is a fragmentary, enlarged view of a keel and associated hull supporting assembly of this invention.
Figure 10:
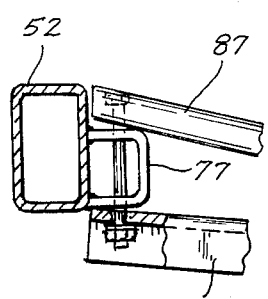
FIGS. 10 and 11 are respective sectional views as taken along the line 10—10 and 11—11, respectively, in FIG. 9.
Figure 11:
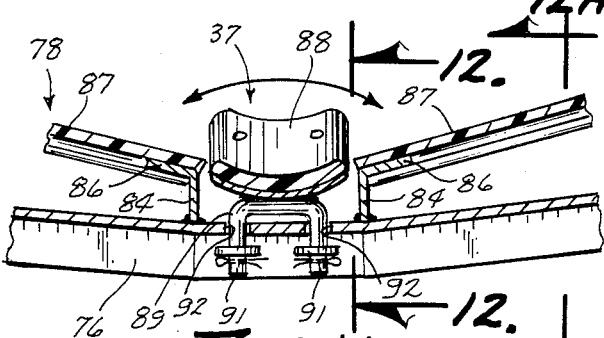
Figure 12:
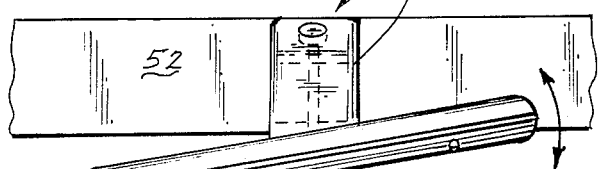
FIGS. 12 and 12A are respective sectional views as taken along the lines 12—12 and 12A—12A, respectively, in FIG. 11 and showing a keel supporting unit of this invention.
Figure 12A:
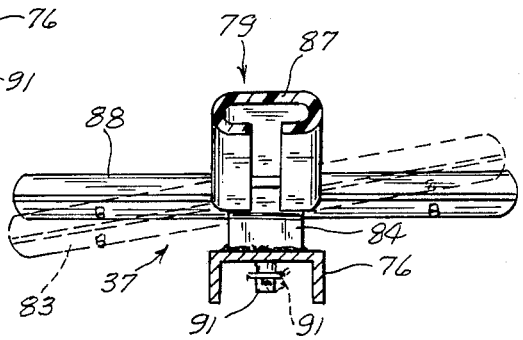

Referring to FIGS. 9–12A, the keel supporting device of unit (37) includes an elongated, cup-shaped element (88) movably mounted on the cross member (76) and extended normal thereto and extended further longitudinally of the frame (31), extending forwardly and rearwardly of the cross member (76) as best illustrated in FIGS. 9, 12 and 12A.

The keel supporting element (88), arranged to receive the keel in a nested manner, is tiltably mounted for movement about both longitudinal and transverse axes by a U-shaped clevis (89), the legs (91) of which depend through openings (92) larger than the legs (91), the lost motion permitting longitudinal tilting or rocking (FIGS. 12, 12A) about a transverse axis, and transverse tilting or rocking (FIG. 11) about a longitudinal axis.

Referring to FIGS. 1–4, and 20, 21, the wheel and axle unit (38) includes a pair of wheels (41) interconnected by an axle (96), the axle suspended at each end by standard suspension springs (97) connected to brackets (98) adjustably mounted on each frame rear member (53, 54). To accommodate different length boats (99) shown by dash lines in FIGS. 3, 4, the brackets (98) may be adjustably moved longitudinally of the frame rear members (53, 54) and also as illustrated and noted hereinbefore, the winch stand assembly (34) may also be longitudinally adjusted relative to the frame (31). A pluraltiy of openings (100) (FIG. 1) are formed in each frame rear member (54, 56) for receiving fasteners (105) (FIG. 22) for securing the brackets (98).

As each fender unit (39) is identical, only one will be described. It comprises a fender element (101) (FIGS. 20, 21), U-shaped in cross-section with a top member (102) arcuate shaped to extend over the upper portion of awsheel (41) in a concentric manner, including forwardly and rearwardly extended horizontally disposed step flanges (103, 104), of equal length and integral therewith, and comprising further mounting units (106) (FIGS. 22, 23) for mounting the fender element (101) via each flange (103, 104). Each mounting unit (106) includes a U-shaped bracket (107) adapted to fit over a frame rear member (54, 56) being fastened thereto by fasteners (108) inserted through an appropriate opening (100), with a laterally extended brace (109) adapted to extend below a flange (103, 104) abutting against a depending lip (111) and secured to the underside of each flange (103, 104) by a pair of cap screws (112) threaded into internally threaded lugs (113) welded to the underside of each flange (103, 104). As with the wheel and axle brackets (98), the fender unit mounting brackets (107) are also longitudinally adjustable on the frame rear members (54, 56).

As described hereinbefore, the hull bottom supporting assembly (42) comprises either a pair of transversely spaced, elongated in-line rollers units (43) (FIGS. 1, 2), extended parallel each other, or a pair of transversely spaced elongated bunk units (44) (FIG. 24), extended parallel each other, either pair interchangeably mounted on a pivotally swingable cross member (46) disposed transversely between the frame rear members (54, 56). Each roller unit (43), identical to the other, comprises an elongated rectangular brace (114) (FIGS. 2, 13–17) welded to a clamp (115) in turn adjustably mounted on the cross member (46) by a pair of U-bolts (116); and having mounted thereon in longitudinal alignment, a plurality of conventional rollers (117), the plurality of rollers (117) providing a predetermined length of support for the boat hull on each side of the boat hull bottom (126).

Figure 3:
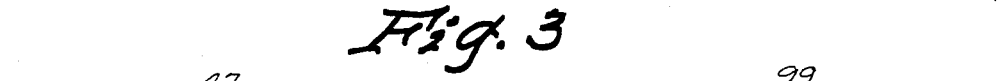
FIG. 3 is a side elevational view thereof.
Figure 4:
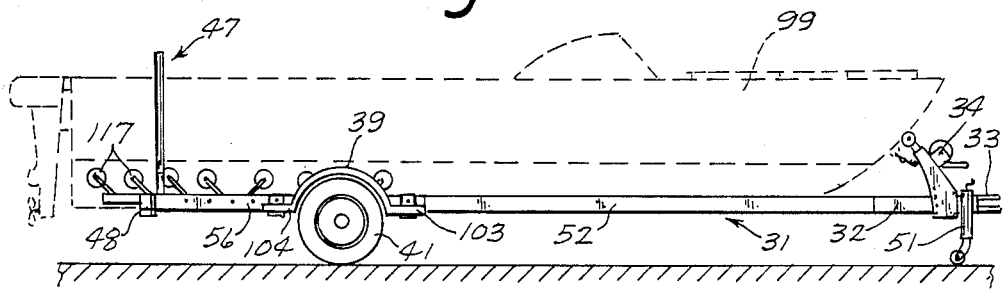
FIG. 4 is another side elevational view thereof showing longitudinal adjustments of several units with a different sized boat carried thereby.

Each roller (117) receives one free leg (118) (FIG. 14) of a U-shaped rod (119), being rotatably and loosely fastened thereto by washers (121) and cotter pins (122), with the other leg (123), parallel with leg (118) secured as be welding to the upper face (124) of the brace (114). Both legs (118 and 123) are disposed normal to the longitudinal extend of the brace (114) such that each roller (117) rotates above the brace about an axis normal or transverse to the longitudinal axis of the brace (114) and of the frame (31). Referring to FIGS. 1 and 2, it is seen that all rollers (117) on each brace (114) are longitudinally aligned, and form a triangle with the keel supporting element (88) for providing a three point support for the forward keel and rearward hull bottom of a boat (99). It is seen further that the rods (119) rearwardly of the cross member (76) lean rearwardly, and the rods (119) forwardly lean forwardly (FIGS. 2, 3).

The cross member (76) has an obtuse V-shape in side elevation (FIG. 15) to accommodate the similar V-shape of the bottom (126) (shown in dash lines in FIG. 15) of a boat and is secured as by welding to a bracket (127) at each outer end (128) thereof, each bracket (127) secured to a U-shaped clamping bracket (129), mounted over a frame rear member (54, 56) by means of a fastening bolt (131) inserted through an opening (132) provided therefor in both the brackets (127, 129) and the openings (100) formed in the members (54, 56) for such purposes. The size of the cross member bracket opening (132) (FIG. 17), is such that the cross member (76) is pivotally swingable about a transversely extended horizontally disposed pivot axis; and with the other brackets (127), the cross member (76) has a U-type shape and is swingable in an arc about the transverse pivot axis. Unlike contemporary trailer arrangements, however, the braces (114) are secured in a stationary manner to the cross memeber (76) and do not move relative thereto, and with the rollers (117) also secured to the braces (114) in a non-adjustable manner, albeit resiliently mounted via the U-shaped rods (119), and having a certain amount of play relative to the rod (119) due to the looseness of the mounting thereto (FIG. 14). This arrangement provides for both longitudinallly extended braces (114) to pivotally swing together and simultaneously about a transverse axis of the fastening bolts (131), with the rollers (117) on each brace (114) each resiliently and automatically or self-seeking a supporting engagement with the portion of that boat hull bottom (126) (FIG. 3) moving into engagement therewith.

Referring to FIGS. 24—26, a pair of transversely spaced, elongate bunk units (44) extended parallel each other and longitudinally of the frame (31) are illustrated, the bunk units (44) having replaced the in-line roller units (43) mounted on the cross member (76). Each bunk unit is identical and comprises a brace (133) substantially identical in size and shape, to the braces (114) (FIG. 1), except they (133) may be of wood, and covered by a cloth or like padding (134) (FIG. 25). The braces (133) are secured by fasteners (136) to a channel-shaped bracket (137) readily attachable to the cross member (76) at a laterally adjustably position thereon by a pair of U-bolts (138).

It may be seen therefore that the bunk units (44) and the in-line roller units (43) are readily interchangeable; and like the roller units (43), the bunk units (44) engage a predetermined length of the bottom sides (126) of a boat hull, the bunk units (44) pivoting simultaneously with the rocking motion of the cross member (46) and acting in concert with the pivotal keep supporting element (88) to form a three-point support arrangement for the boat (99) (FIG. 3) for equal weight distribution. Additionally, the bunk units (44) are free with their single mounting upon the cross member (76) to seek engagement for substantially their full length with the bottom (126) of a boat hull upon the boat being fully pulled thereupon. Further, with the bunk unit (44) mounted arrangement on the cross member (76), longitudinal adjustment of the cross member (76) relative to the frame (31) provides for handling different tongue weight requirements for a variety of boats without requiring an adjustement of the position of the wheel and axle unit (38) relative to the frame (31).

A pair of post load guide units (47) are provided at the rear ends (139) (FIGS. 1, 18) of the frame rear members (54, 56) for guiding a boat onto and off of the frame assembly (31), the units (47) being particularly helpful to a boat operator when the majority of the boat supporting frame (31) and roller or bunk units (43 or 44), respectively, are submerged. As each unit (47) is identical, only one unit (47) (FIGS. 18, 19) will be described.

The post load guide unit (47) comprises an L-shaped unitary member (141) including a first pair of parallel legs (142), each adapted to engage the outside or inside of the frame end (139), a second leg (143) extended at right angles relative to the first legs (142) and adapted to mount a tail light (144), and a circular portion (146) forming a socket (147) intermediate the first legs (142) and the second leg (143) for receiving the base (148) of a post (149) (FIG. 1). The first legs (142) have pairs of aligned openings (151) formed therein for receiving fasteners (152) which also pass through the frame ends (139), and the second leg (143) also has openings (153) for receiving fasteners (not shown) for mounting the tail light (144) thereto. To close and tighten the socket (147), such as to frictionally grasp and hold the post base (148), openings (154) in the circular portion ears (156), and fasteners (157) therefore are provided.

Accordingly, it can be seen that the illustrated embodiment of the present invention accomplishes all of the objectives referred to hereinbefore.

Obviously, many modifications and variations of the present invention are possible in light of the above teachings. It is therefore to be understood that, within the scope of the appended claims, the invention may be practised otherwise than as specifically described.

I claim:

1. A winch assembly for use with a boat trailer having a tongue at the front end thereof, said which assembly comprising:

winch means adapted to rotatably mount a cable for removable attachement to a boat to be movably mounted onto the boat trailer; and stand means adjustably mounted on the tongue and movable between an upright position and a position tilted toward the rear end of the boat trailer, said stand means supporting said winch means;

and wherein said stand means comprises a channel shaped member having a bottom portion adapted to straddle the tongue;

and further wherein said member has a pair of transversely aligned first openings formed forwardly in the bottom portion for receiving a connecting element therethrough, and said member having further a pair of transversely aligned, plurality of second openings formed rearwardly in the bottom portion and also formed in an upwardly, rearwardly curving arc, said second openings spaced apart, each transversely aligned pair of second openings adapted to receive a second connecting element.

2. A winch assembly as defined in claim 1 wherein a keel engaging means is vertically adjustably mounted within said member.

* * * * *